(12) United States Patent
Kamo

(10) Patent No.: US 11,283,126 B2
(45) Date of Patent: Mar. 22, 2022

(54) POWER STORAGE DEVICE DISPOSED BETWEEN FRAMES

(71) Applicant: TOYOTA JIDOSHA KABUSHIKI KAISHA, Toyota (JP)

(72) Inventor: Yoshiro Kamo, Kanagawa-ken (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 385 days.

(21) Appl. No.: 16/244,277

(22) Filed: Jan. 10, 2019

(65) Prior Publication Data

US 2019/0221796 A1 Jul. 18, 2019

(30) Foreign Application Priority Data

Jan. 12, 2018 (JP) .............................. JP2018-003766

(51) Int. Cl.
| | |
|---|---|
| *H01M 50/20* | (2021.01) |
| *H01M 50/166* | (2021.01) |
| *H01M 50/502* | (2021.01) |
| *B60L 50/60* | (2019.01) |
| *H01M 10/04* | (2006.01) |

(52) U.S. Cl.
CPC ............. *H01M 50/20* (2021.01); *B60L 50/66* (2019.02); *H01M 10/0481* (2013.01); *H01M 50/166* (2021.01); *H01M 50/502* (2021.01); *H01M 2220/20* (2013.01)

(58) Field of Classification Search
CPC .. H01M 50/20; H01M 50/166; H01M 50/502; H01M 10/0481; H01M 2220/20; H01M 50/256; B60L 50/66; B60L 50/64; Y02P 70/50; Y02E 60/10; Y02T 10/70; B60R 16/04; B62D 21/09
USPC ......................................................... 429/99
See application file for complete search history.

(56) References Cited

U.S. PATENT DOCUMENTS

| | | |
|---|---|---|
| 2015/0207119 A1 | 7/2015 | Onodera et al. |
| 2016/0190526 A1 | 6/2016 | Yamada et al. |
| 2018/0287223 A1* | 10/2018 | Meng .................. H01M 10/425 |

FOREIGN PATENT DOCUMENTS

| | | |
|---|---|---|
| CN | 101944580 A | 1/2011 |
| CN | 203503729 U | 3/2014 |
| CN | 104603977 A | 5/2015 |
| CN | 205303550 U | 6/2016 |
| JP | 2016-122572 A | 7/2016 |

* cited by examiner

*Primary Examiner* — Gary D Harris
(74) *Attorney, Agent, or Firm* — Sughrue Mion, PLLC

(57) ABSTRACT

A power storage device including: at least one power storage module disposed between a first frame and a second frame disposed at an interval from each other, the power storage module including a plurality of power storage cells arranged in sequence, the first frame and the second frame provided in a vehicle or the power storage device; and a fixture, wherein: the power storage module is fixed to the first frame by the fixture, and is not fixed to the second frame.

8 Claims, 12 Drawing Sheets

POWER STORAGE DEVICE DISPOSED BETWEEN FRAMES

INCORPORATION BY REFERENCE

The disclosure of Japanese Patent Application No. 2018-003766 filed on Jan. 12, 2018 including the specification, drawings and abstract is incorporated herein by reference in its entirety.

BACKGROUND

1. Technical Field

The present disclosure relates to a power storage device and a vehicle.

2. Description of Related Art

There have been various proposals for a power storage device including a power storage module. For example, Japanese Unexamined Patent Application Publication No. 2016-122572 (JP 2016-122572 A) discloses a power storage device that is disposed between a first side member and a second side member of a vehicle.

The first side member and the second side member are disposed at an interval from each other in the vehicle-width direction. The power storage device includes a power storage module, a first mounting member, and a second mounting member. The power storage module includes a plurality of power storage cells arranged in the vehicle-width direction. An end portion of the power storage module on the first side member side is fixed to the first side member by the first mounting member. An end portion of the power storage module on the second side member side is fixed to the second side member by the second mounting member.

SUMMARY

It often happens that gas is accumulated inside the power storage cells due to time degradation. When the power storage cells are deformed to expand, the power storage module is deformed to extend in the vehicle-width direction.

When the power storage module is deformed to extend in the vehicle-width direction, high loads are applied to the first mounting member and the second mounting member so that the first mounting member and the second mounting member are deformed.

The disclosure provides a power storage device and a vehicle capable of restraining the occurrence of various adverse effects that may otherwise occur due to deformation of power storage cells to expand.

A first aspect of the present disclosure relates to a power storage device including: at least one power storage module disposed between a first frame and a second frame disposed at an interval from each other, the power storage module including a plurality of power storage cells arranged in sequence, the first frame and the second frame provided in a vehicle or the power storage device; and a fixture, wherein: the power storage module is fixed to the first frame by the fixture, and is not fixed to the second frame.

According to the above-described power storage device, the power storage module is fixed to the first frame but the power storage module is not fixed to the second frame. Therefore, the deformation of the power storage module is allowed and the deformation of the first and second frames can be restrained. As a result, it is possible to restrain the occurrence of various adverse effects that may occur due to the deformation of the power storage module.

In the above aspect, the power storage module may be pressed against the second frame and is in contact with the second frame.

According to the above-described power storage device, the power storage module is fixed to the first frame and pressed against the second frame and is in contact with the second frame. Therefore, the power storage module is restrained from deforming to extend in the arrangement direction of the first frame and the second frame. As a result, it is possible to restrain the occurrence of various adverse effects that may otherwise occur due to the deformation of the power storage module to extend.

In the above aspect, the power storage module may be pressed against the second frame with expansion of the power storage module and is in contact with the second frame.

A second aspect of the present disclosure relates to a power storage device including: a first frame and a second frame disposed at an interval from each other; at least one power storage module disposed between the first frame and the second frame, the power storage module including a plurality of power storage cells arranged in sequence; and a fixture, wherein: the power storage module includes a first portion on a first frame side and a second portion on a second frame side; of the first portion and the second portion, the fixture is provided only to the first portion; and the fixture fixes the power storage module to the first frame.

According to the above aspect, the power storage module is fixed at the first portion on the first frame side, and no fixture is provided to the second portion on the second frame side. Therefore, when the power storage cells are deformed to expand, the power storage module is allowed to deform so as to extend toward the second frame side. In this event, since no fixture is provided on the second portion side, even when the power storage module is deformed to extend toward the second frame side, the occurrence of adverse effects that occur in the power storage device of the related art is restrained.

In the above aspect, the second portion may be pressed against the second frame and is in contact with the second frame.

The above-described power storage device is pressed against and in contact with the second frame on the second portion side and fixed to the first frame by the fixture so that the power storage module is restrained from deforming to extend. Therefore, it is possible to restrain the occurrence of various adverse effects that may otherwise occur due to the deformation of the power storage module to extend.

In the above aspect, the power storage cells may be arranged in sequence in a facing direction in which the first frame and the second frame face each other; the power storage module may include a restrainer restraining the power storage cells; the restrainer may restrain the power storage cells such that the power storage cells are arranged in sequence in the facing direction; and the restrainer may be configured to deform in the facing direction.

With the above-described power storage device, when a load that causes the power storage module to extend in the arrangement direction is applied to the restrainer due to deformation of the power storage cells to expand, the restrainer can be deformed to extend in the arrangement direction.

In the above aspect, a plurality of the power storage modules may be provided in the power storage device; the power storage modules may include a first power storage module and a second power storage module; the power storage modules may further include a bus bar electrically connecting the first power storage module and the second power storage module to each other; and the bus bar may be configured to connect a terminal of the first power storage module and a terminal of the second power storage module to each other, the terminal of the first power storage module being a terminal on an end side of the first power storage module and located on a first frame side, the terminal of the second power storage module being a terminal on an end side of the second power storage module and located on the first frame side.

With the above-described power storage device, even when one of the first power storage module and the second power storage module is deformed to extend in the arrangement direction, since the end portions of the first power storage module and the second power storage module on the first frame side are fixed to the first frame, the positions of these end portions are restrained from being displaced.

As a result, it is possible to restrain displacement of the positions of both ends of the bus bar and thus restrain damage to the end portions of the bus bar.

In the above aspect, the power storage cells may be arranged in sequence in an arrangement direction perpendicular to a direction in which the first frame and the second frame face each other.

A third aspect of the present disclosure relates to a vehicle including: a first frame and a second frame disposed at an interval from each other; at least one power storage module; and a fixture, wherein: the power storage module is disposed between the first frame and the second frame; the power storage module includes a plurality of power storage cells arranged in sequence; and the power storage module is fixed to the first frame by the fixture, and is not fixed to the second frame.

In the above aspect, the power storage module may be pressed against the second frame with expansion of the power storage module and is in contact with the second frame.

According to the power storage device and the vehicle of the present disclosure, it is possible to restrain the occurrence of various adverse effects that may otherwise occur due to deformation of the power storage cells to expand.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a sectional view showing a power storage cell 42 shown in FIG. 4 and so on;

DETAILED DESCRIPTION OF EMBODIMENTS

Referring to FIGS. 1 to 19, the first to third embodiments will be described. The same symbols will be assigned to the same or substantially the same configurations in FIGS. 1 to 19, thereby omitting duplicate description thereof.

First Embodiment

Figure 1:
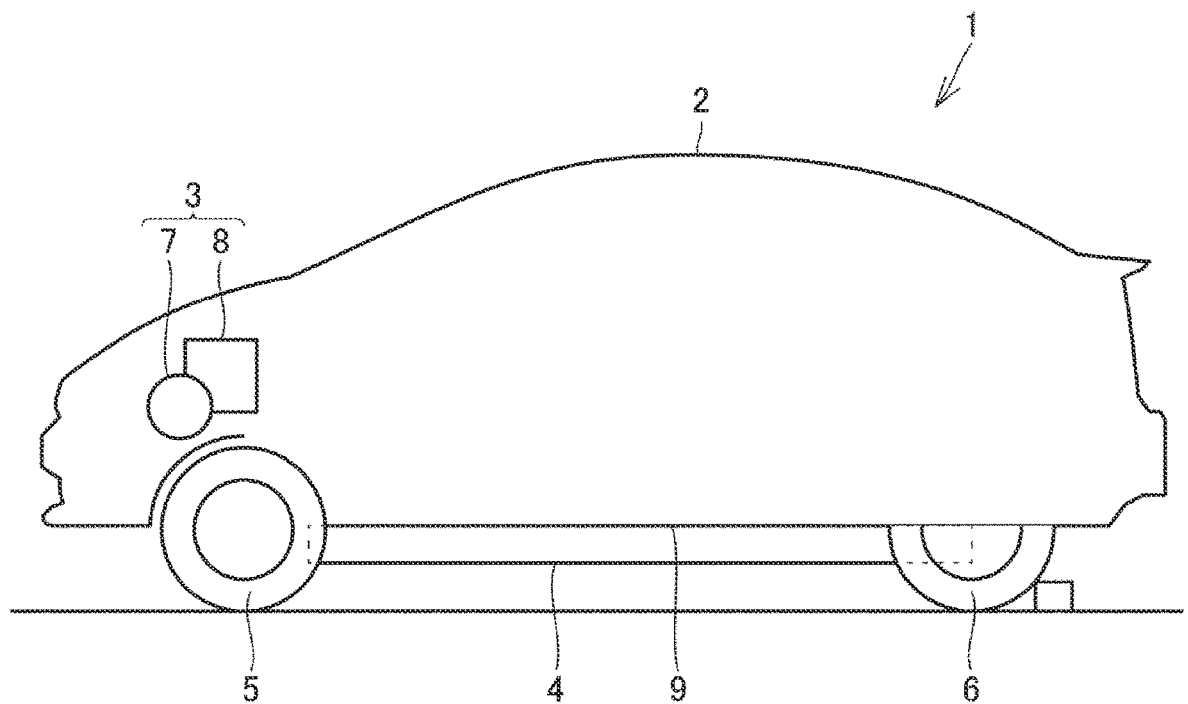
FIG. 1 is a schematic diagram schematically showing a vehicle 1.

FIG. 1 is a schematic diagram schematically showing a vehicle 1. The vehicle 1 includes a vehicle body 2, a driving device 3, a power storage device 4, front wheels 5, and rear wheels 6. The front wheels 5 are provided on the front side of the vehicle 1 with respect to the middle of the vehicle 1 in the vehicle front-rear direction D, and the rear wheels 6 are provided on the rear side of the vehicle 1 with respect to the middle of the vehicle 1 in the vehicle front-rear direction D.

The vehicle body 2 is formed with a boarding space, a front accommodation space, and a rear accommodation space. The boarding space is a space where an occupant such as a driver boards. The rear accommodation space is formed rearward of the boarding space. Luggage and so on are placed in the rear accommodation space. The front accommodation space is formed forward of the boarding space. The driving device 3 and so on are disposed in the front accommodation space.

The vehicle body 2 includes a skeleton frame. The skeleton frame includes a floor panel 9. The floor panel 9 forms the bottom of the vehicle body 2.

The driving device 3 includes a rotary electric machine 7 and a power control unit (PCU) 8. The PCU 8 is electrically connected to the rotary electric machine 7 and to the power storage device 4. The PCU 8 includes an inverter and a converter. The rotary electric machine 7 is mechanically connected to the front wheels 5.

The power storage device 4 is provided on a lower surface of the floor panel 9. The power storage device 4 supplies direct-current power to the PCU 8. The PCU 8 boosts voltage of the supplied direct-current power and then converts the boosted direct-current power into alternating-current power. Using the alternating-current power supplied from the PCU 8, the rotary electric machine 7 generates driving force that rotates the front wheels 5.

The vehicle 1 may be an electric vehicle or may be a plug-in hybrid vehicle or a hybrid vehicle.

Figure 2:
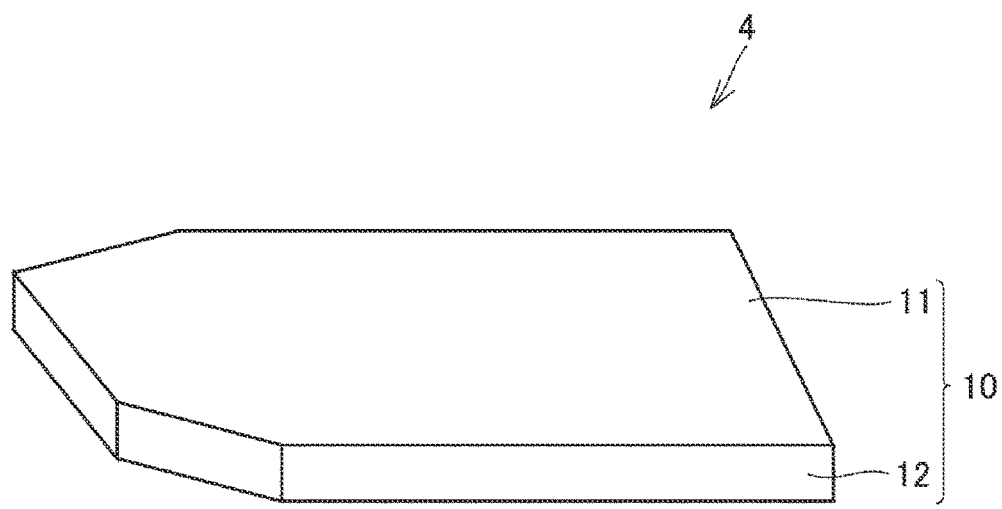
FIG. 2 is a perspective view schematically showing a power storage device 4.

FIG. 2 is a perspective view schematically showing the power storage device 4. The power storage device 4 includes a battery case 10. The battery case 10 includes a case body 12 and a lid 11. The case body 12 is formed with an opening that opens upward. The case body 12 is made of, for example, a metal material such as an aluminum alloy. The case body 12 is fixed to the floor panel 9. The lid 11 is provided to the case body 12 so as to close the opening of the case body 12. The lid 11 is made of, for example, a resin for weight saving of the battery case 10.

Figure 3:
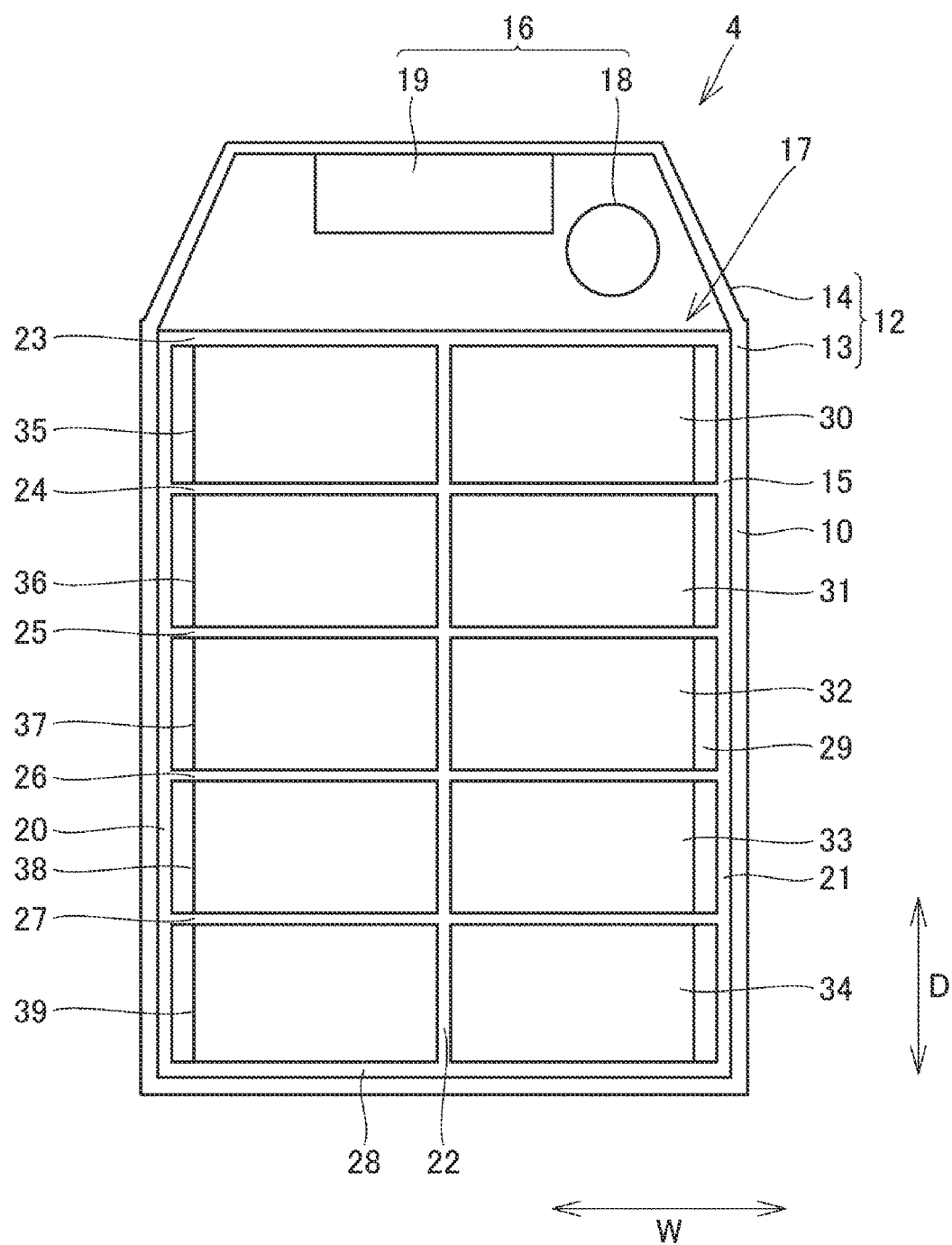
FIG. 3 is a plan view schematically showing the power storage device 4 in a state where a lid 11 is removed.

FIG. 3 is a plan view schematically showing the power storage device 4 in a state where the lid 11 is removed. Herein, FIG. 3 shows the power storage device 4 in a state before the occurrence of time degradation.

The power storage device 4 includes the case body 12, a reinforcing member 15, a mounted device 16, and a power storage unit 17. The case body 12 is formed hollow and includes a bottom plate and a peripheral wall portion extending along the outer periphery of the bottom plate. The case body 12 includes a body portion 13 and a protruding portion 14. The body portion 13 is formed in a generally rectangular parallelepiped shape. The protruding portion 14 is formed to protrude forward from a front end portion of the body portion 13. The protruding portion 14 is formed such that its length in the width direction W of the vehicle body 2 decreases as going forward from its connecting portion with the body portion 13.

The mounted device 16 is provided in the protruding portion 14. The mounted device 16 includes a cooling device 18 and a junction box 19. The cooling device 18 is a device for cooling the power storage unit 17.

The reinforcing member 15 is disposed in the body portion 13. The reinforcing member 15 includes a bottom plate 29 and a plurality of frames arranged in a grid pattern. In FIG. 3, the bottom plate 29 of the reinforcing member 15 is disposed on an upper surface of the bottom plate of the case body 12.

The reinforcing member 15 includes side frames 20, 21, a center frame 22, and cross frames 23 to 28.

The side frames 20, 21 and the center frame 22 are formed to extend in the front-rear direction D. The side frames 20, 21 are disposed at an interval from each other in the width direction W, and the center frame 22 is disposed between the side frames 20, 21.

The cross frames 23 to 28 are formed to extend in the width direction W such that each of the cross frames 23 to 28 connects the side frame 20 and the side frame 21 to each other. The cross frames 23 to 28 are disposed at an interval from each other in the front-rear direction D.

In this way, the frames are arranged in a grid pattern so that accommodation spaces where power storage modules 30 to 39 are respectively disposed are formed by the frames and the bottom plate 29.

Figure 4:
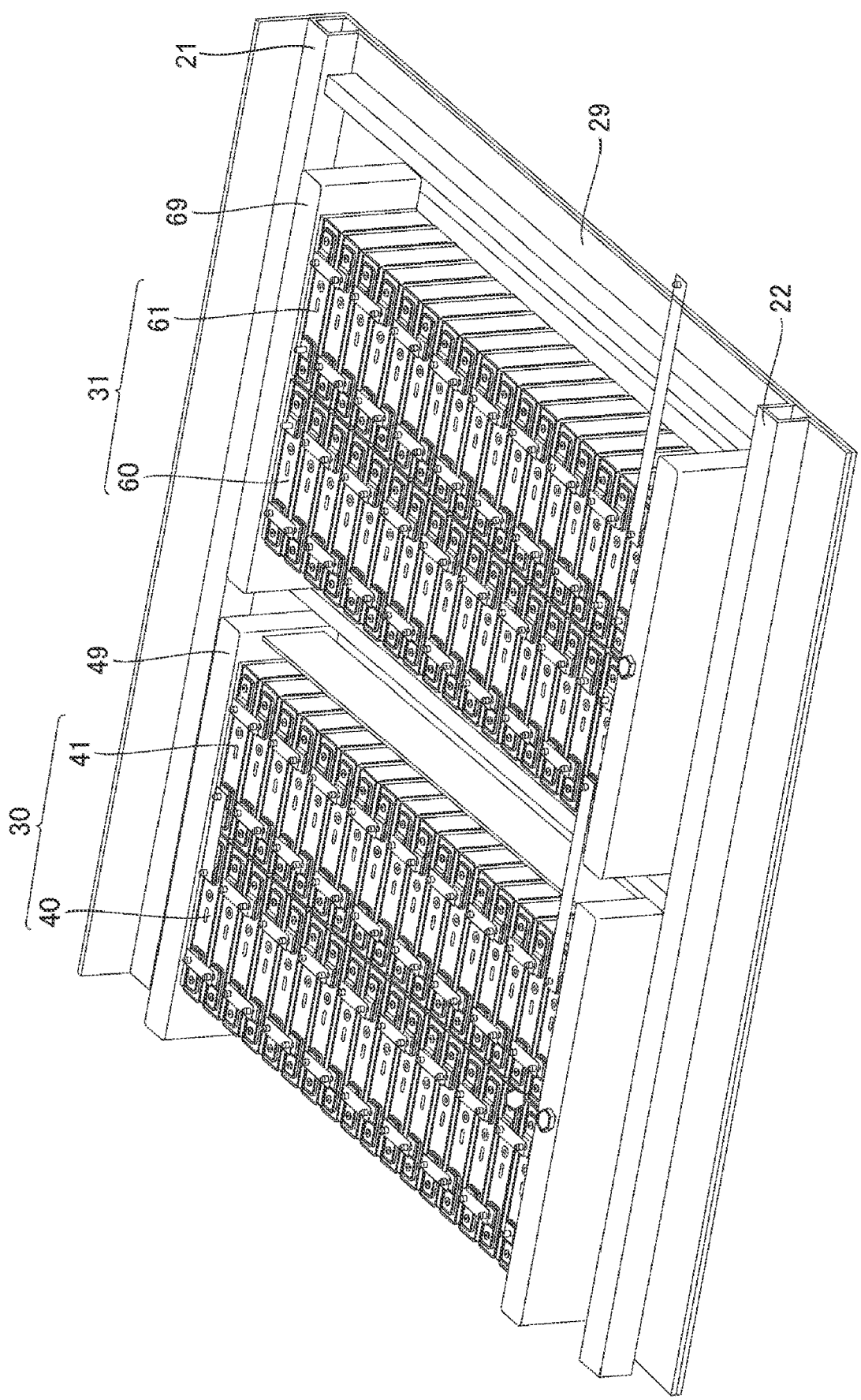
FIG. 4 is a perspective view showing part of the power storage device 4.
Figure 5:
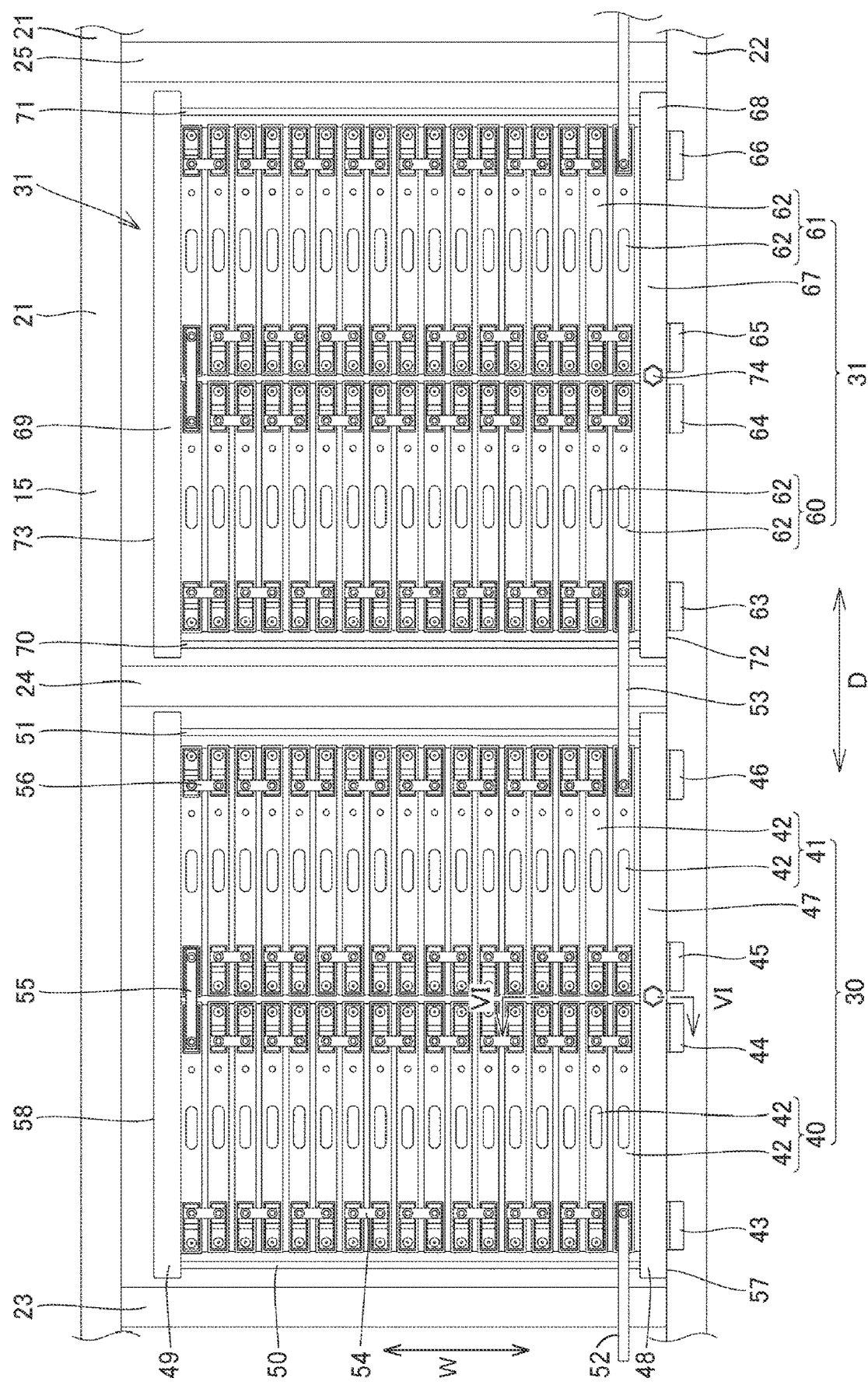
FIG. 5 is a plan view showing part of the power storage device 4.

FIG. 4 is a perspective view showing part of the power storage device 4, and FIG. 5 is a plan view showing part of the power storage device 4. The power storage module 30 is disposed in the accommodation space formed by the cross frames 23, 24, the side frame 21, and the center frame 22. Likewise, the power storage module 31 is disposed in the accommodation space formed by the side frame 21, the center frame 22, and the cross frames 24, 25.

The power storage module 30 includes a cell row 40, a cell row 41, and a restrainer 47. The power storage module 30 is provided with fixtures 43 to 46 and a plurality of bus bars 52, 53, 54, 55, 56. The cell row 40 and the cell row 41 are arranged in the front-rear direction D. The cell row 40 includes a plurality of power storage cells 42 arranged in the width direction W, and the cell row 41 also includes a plurality of power storage cells 42 arranged in the width direction W. Insulating plates are respectively disposed between the power storage cells 42.

The restrainer 47 includes end plates 48, 49 and bands 50, 51. The end plate 48 is provided at end faces of the cell rows 40, 41 on the first end side in the width direction W. The end plate 49 is provided at end faces of the cell rows 40, 41 on the second end side in the width direction W. The end plates 48, 49 are each formed by, for example, a metal plate member and an insulting member covering the surface of the plate member.

The band 50 and the band 51 are made of, for example, a resin material. Therefore, when loads are applied to the end plate 48 and the end plate 49 in directions to push them away from each other, the band 50 and the band 51 are deformed to extend. In this way, the band 50 and the band 51 are formed extendable in the width direction W. By the restrainer 47 thus configured, the power storage cells 42 of the cell rows 40, 41 are restrained so as to be arranged in the width direction W.

The power storage module 30 includes an end portion 57 located at a first end in the width direction W and an end portion 58 located at a second end in the width direction W, and the fixtures 43, 44, 45, 46 fix the end portion 57 to the center frame 22. Specifically, the fixtures 43, 44, 45, 46 fix the end plate 48 to the center frame 22. In this way, the fixtures 43, 44, 45, 46 are provided only to the end portion 57 and are not provided to the end portion 58. The end portion 57 is in close contact with the center frame 22. Alternatively, the end portion 57 may be fixed to the center frame 22 with an insulating plate or the like interposed between the end portion 57 and the center frame 22.

In the example shown in FIG. 5 and so on, the end portion 57 of the power storage module 30 is fixed to the center frame (first frame) 22, but the fixing position is not limited to the position described above.

For example, a portion of the power storage module 30 on the center frame 22 side with respect to the middle of the power storage module 30 in the width direction W may be fixed to the center frame 22.

That is, in the disclosure, the portion of the power storage module 30 on the center frame (first frame) 22 side means a portion of the power storage module 30 located on the center frame 22 side with respect to the middle of the power storage module 30 in the width direction W (arrangement direction).

With respect to the portion of the power storage module 30 located on the center frame 22 side and a portion of the power storage module 30 located on the side frame 21 side, the fixtures 43 to 46 that fix the power storage module 30 to the reinforcing member 15 are provided only to the portion of the power storage module 30 located on the center frame 22 side.

The power storage module 30 is provided with the bus bars 52, 53, 54, 55, 56. The bus bars 54 are provided to the cell row 40. The bus bars 54 connect in series the power storage cells 42 that are adjacent to each other in the width direction W.

The bus bar 55 connects the cell row 40 and the cell row 41 in series. Specifically, the bus bar 55 connects in series the power storage cell 42 of the cell row 40 located on the side frame 21 side and the power storage cell 42 of the cell row 41 located on the side frame 21 side.

The bus bars 56 are provided to the cell row 41. The bus bars 56 connect in series the power storage cells 42 that are adjacent to each other in the width direction W.

The bus bar 53 connects the power storage module 30 and the power storage module 31 in series. Specifically, the bus bar 53 is connected to the power storage cell 42 of the cell row 41 located closest to the center frame 22.

Figure 6:
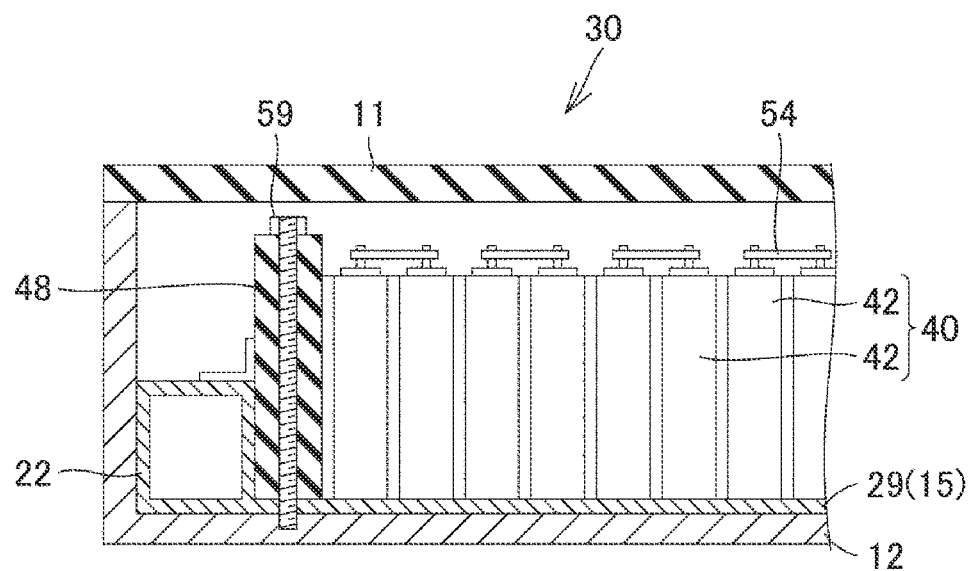
FIG. 6 is a sectional view taken along the line VI-VI of FIG. 5.

FIG. 6 is a sectional view taken along the line VI-VI of FIG. 5. The power storage module 30 includes a bolt 59 that fixes the end plate 48 to the bottom plate 29 of the reinforcing member 15 and to the bottom plate of the case body 12.

Referring back to FIG. 5, the end plate 49 (the end portion 58) of the power storage module 30 is not fixed. Therefore, the end portion 58 is provided so as to be movable in the width direction W when the cell rows 40, 41 expand in the width direction W. The power storage module 30 is disposed on an upper surface of the bottom plate 29, and the end plate 49 being the end portion 58 is movable in the width direction W on the upper surface of the bottom plate 29.

The power storage module 31 is configured the same as the power storage module 30. The power storage module 31 includes cell rows 60, 61 and a restrainer 67. The power storage module 31 is provided with a plurality of fixtures 63, 64, 65, 66.

The cell rows 60, 61 each include a plurality of power storage cells 62 arranged in the width direction W. In the cell row 60, the power storage cells 62 are connected in series by bus bars. Also in the cell row 61, the power storage cells 62 are connected in series by bus bars.

The cell row 60 and the cell row 61 are connected in series by a bus bar. The power storage module 31 is connected in series to the power storage module 30 by the bus bar 53. Specifically, the bus bar 53 connects in series the power storage cell 62 of the cell row 60 located at an end of the cell row 60 on the center frame 22 side and the power storage cell 42 of the cell row 41 located at an end of the cell row 41 on the center frame 22 side.

The restrainer 67 includes end plates 68, 69 and bands 70, 71. The end plate 68 is provided at ends of the cell rows 60, 61 on the center frame 22 side. The end plate 69 is provided at ends of the cell rows 60, 61 on the side frame 21 side. The bands 70, 71 are provided to connect the end plate 68 and the end plate 69 to each other. The bands 70, 71 are also made of a resin material or the like and thus are formed extendable in the width direction W.

The power storage module 31 includes an end portion 72 located at one end in the width direction W and an end portion 73 located on the side opposite to the end portion 72. The fixtures 63, 64, 65, 66 fix the end portion 72 of the power storage module 31 to the center frame 22. Specifically, the end plate 68 is located at the end portion 72, and the fixtures 63 to 66 fix the end plate 68 to the center frame 22.

The end plate 68 is fixed to the bottom plate of the case body 12 and to the bottom plate 29 by a bolt 74.

On the other hand, the end portion 73 of the power storage module 31 is not fixed and is provided so as to be movable in the width direction W on the upper surface of the bottom plate 29. The end plate 69 is disposed at the end portion 73.

In the state shown in FIG. 5, the end plate 69 is disposed at an interval from the side frame 21.

Figure 7:
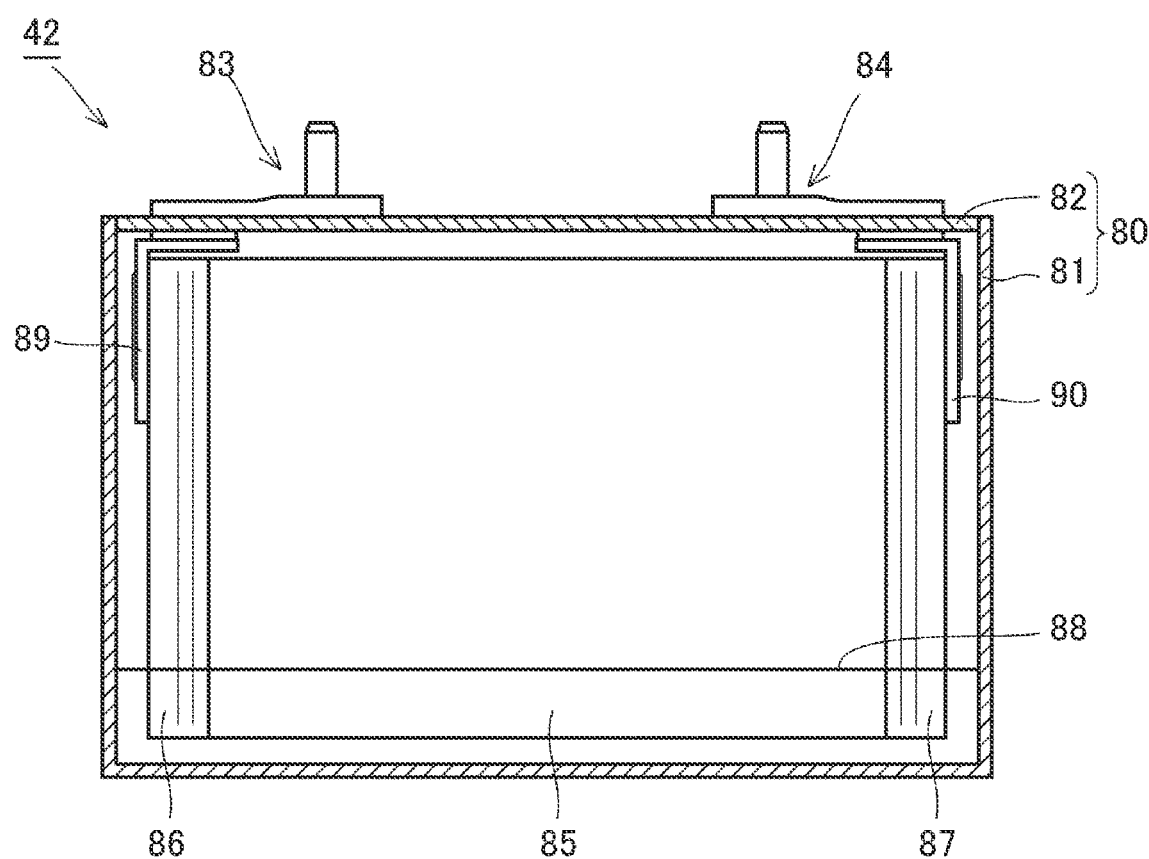

FIG. 7 is a sectional view showing the power storage cell 42 shown in FIG. 4 and so on. The power storage cell 42 includes an accommodation case 80, a positive electrode external terminal 83, a negative electrode external terminal 84, an electrode assembly 85, an electrolyte solution 88, a positive electrode current collecting terminal 89, and a negative electrode current collecting terminal 90.

The accommodation case 80 includes a case body 81 and a lid 82. The case body 81 is formed with an opening that opens upward. The lid 82 is welded to the case body 81 so as to close the opening of the case body 81.

The positive electrode external terminal 83 and the negative electrode external terminal 84 are provided on an upper surface of the lid 82. The bus bars 54 or the like are connected to the positive electrode external terminal 83 and the negative electrode external terminal 84. The electrode assembly 85, the electrolyte solution 88, the positive electrode current collecting terminal 89, and the negative electrode current collecting terminal 90 are placed in the accommodation case 80.

The electrode assembly 85 includes a plurality of negative electrode sheets, a plurality of positive electrode sheets, and a plurality of separators. The electrode assembly 85 may be either a stacked-type electrode assembly or a wound-type electrode assembly.

The negative electrode sheet includes a metal foil such as a copper foil and negative electrode mixture layers formed on front and back surfaces of the metal foil. The negative electrode mixture layer contains a negative electrode active material, a binder, and so on. A carbonaceous material or the like may be used as the negative electrode active material. The metal foil of the negative electrode sheet has an uncoated portion where no negative electrode mixture layer is formed.

The positive electrode sheet includes a metal foil such as an aluminum foil and positive electrode mixture layers formed on front and back surfaces of the metal foil. The positive electrode mixture layer contains a positive electrode active material, a binder, and so on. The metal foil of the positive electrode sheet has an uncoated portion where no positive electrode mixture layer is formed. The separator is formed by a microporous resin sheet, a nonwoven fabric, or the like.

The electrode assembly 85 includes positive electrode portions 86 and negative electrode portions 87. The positive electrode portions 86 are formed by the uncoated portions of the positive electrode sheets. The negative electrode portions 87 are formed by the uncoated portions of the negative electrode sheets.

The positive electrode current collecting terminal 89 is provided so as to be connected to the positive electrode portions 86 and to the positive electrode external terminal 83. The negative electrode current collecting terminal 90 is provided so as to be connected to the negative electrode portions 87 and to the negative electrode external terminal 84.

The electrolyte solution 88 contains, for example, at least one of propylene carbonate (PC) and ethylene carbonate (EC). The electrolyte solution 88 contains an additive. As the additive, the electrolyte solution 88 contains at least one of vinyl acetate (VA), divinyl adipate (ADV), and allyl methyl carbonate (ACM).

Figure 8:
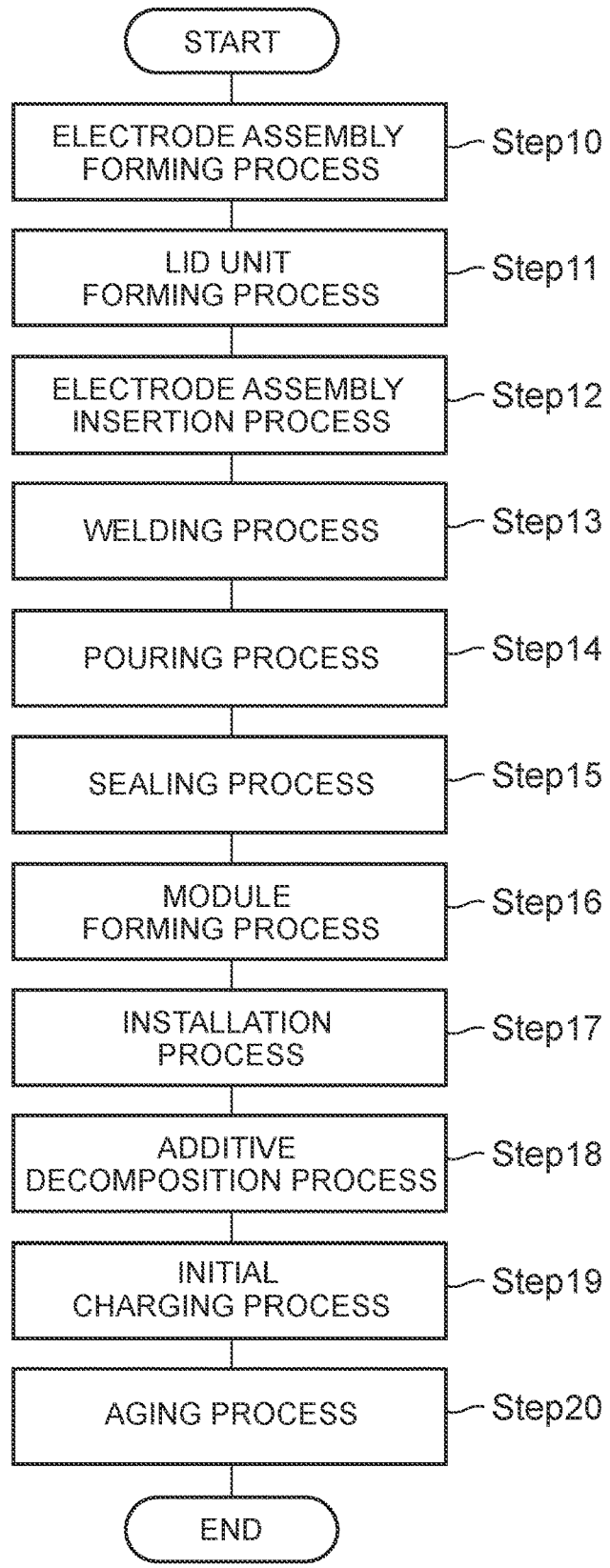
FIG. 8 is a manufacturing process flowchart showing processes of forming the power storage device 4.

Processes of forming the power storage device 4 configured as described above will be briefly described. FIG. 8 is a manufacturing process flowchart showing processes of forming the power storage device 4. Hereinafter, "Step" representing a number of each of the processes in FIG. 8 will be abbreviated as "S". The processes of forming the power storage device 4 include an electrode assembly forming process S10, a lid unit forming process S11, an electrode assembly insertion process S12, a welding process S13, a pouring process S14, a sealing process S15, a module forming process S16, an installation process S17, an additive decomposition process S18, an initial charging process S19, and an aging process S20.

The electrode assembly forming process S10 is a process of forming the electrode assembly 85. Specifically, the electrode assembly forming process S10 includes a process of sequentially stacking the separator, the positive electrode sheet, the separator, and the negative electrode sheet.

The lid unit forming process S11 is a process of joining together the positive electrode external terminal 83, the negative electrode external terminal 84, the lid 82, the positive electrode current collecting terminal 89, the negative electrode current collecting terminal 90, and the electrode assembly 85. Specifically, the lid unit forming process S11 includes a process of coupling an upper end portion of the positive electrode current collecting terminal 89 to the positive electrode external terminal 83 and a process of coupling an upper end portion of the negative electrode current collecting terminal 90 to the negative electrode external terminal 84. Further, the lid unit forming process S11 includes a process of welding the lower end side of the positive electrode current collecting terminal 89 to the positive electrode portions 86 and a process of welding the lower end side of the negative electrode current collecting terminal 90 to the negative electrode portions 87.

In the electrode assembly insertion process S12, the electrode assembly 85 coupled to the lid 82 is inserted into the case body 81. Then, the lid 82 is disposed at the opening edge portion of the case body 81. In the welding process S13, the outer peripheral edge portion of the lid 82 and the opening edge portion of the case body 81 are welded together. In this way, the accommodation case 80 is formed.

In the pouring process S14, the electrolyte solution 88 is supplied into the accommodation case 80 through a pouring hole formed in the lid 82. The sealing process S15 is a process of sealing the pouring hole formed in the lid 82.

In this way, the power storage cell 42 can be formed through the processes from the electrode assembly forming process S10 to the sealing process S15.

The module forming process S16 includes a cell row forming process and a restraining process. The cell row forming process is a process of forming the cell row 40 and the cell row 41. The power storage cells 42 of the cell rows 40, 41 are connected in series by the bus bars 54, 55, 56.

The restraining process is a process of restraining the cell row 40 and the cell row 41 using the restrainer 47. In this way, the power storage module 30 is formed. Through the same processes, the other power storage modules 31 to 39 are also formed.

The installation process S17 includes a module disposing process and a module fixing process. The module disposing process is a process of disposing the power storage modules 30 to 39 in the power storage module accommodation spaces formed by the frames of the reinforcing member 15.

In this event, as shown in FIG. 5 and so on, the length of the power storage module 30 in the width direction W is shorter than the distance between the side frame 21 and the center frame 22 in the width direction W. Therefore, when disposing the power storage module 30 between the side frame 21 and the center frame 22, the power storage module 30 can be easily disposed. Likewise, the power storage modules 31 to 39 can also be easily disposed in the accommodation spaces formed by the reinforcing member 15.

In the module fixing process, the power storage module 30 is fixed to the center frame 22 using the fixtures 43, 44, 45, 46 and the bolt 59. Likewise, the other power storage modules 31 to 39 are also fixed to the center frame 22.

In this event, the power storage modules 30 to 34 are in a state where end portions thereof on the side frame 21 side are spaced apart from the side frame 21. Likewise, the power storage modules 35 to 39 are in a state where end portions thereof on the side frame 20 side are spaced apart from the side frame 20.

The additive decomposition process S18 is a process of decomposing the additive of the electrolyte solution by applying a predetermined potential to each power storage cell. Specifically, the additive decomposition process S18 is a process of electrolyzing vinyl acetate (VA), divinyl adipate (ADV), and allyl methyl carbonate (ACM).

The initial charging process S19 is a process of forming solid electrolyte interphase (SEI) films respectively on surfaces of the negative electrode mixture layers of the negative electrode sheets. In the initial charging process S19, the power storage cells 42 are charged. Consequently, the SEI films are respectively formed on the surfaces of the negative electrode mixture layers of the negative electrode sheets by the electrolyzed additive. By the formation of the SEI films on the surfaces of the negative electrode mixture layers, the surfaces of the negative electrode mixture layers can be protected from the electrolyte solution 88.

The aging process S20 is a process of leaving the power storage cells 42 in a charged state at a predetermined temperature for a predetermined period of time (e.g. two weeks to three weeks). The aging process S20 is a process of identifying the power storage cell 42 with a high self-discharge rate and replacing it with a normal power storage cell 42.

Herein, gas is generated in the power storage cells 42 in the additive decomposition process S18, the initial charging process S19, and the aging process S20. As a result, the accommodation cases 80 of the power storage cells 42 expand.

As shown in FIG. 5 and so on, the accommodation cases 80 of the power storage cells 42 are in an expanded state at timing when the aging process S20 has finished.

When the power storage cells 42 expand, a load is applied to the end plate 49 so as to move the end plate 49 toward the side frame 21. Since the bands 50, 51 are made of the extendable material, the bands 50, 51 are deformed so that the length of the bands 50, 51 in the width direction W increases.

Since the bands 50, 51 are deformed to extend, the power storage module 30 is allowed to deform so as to extend in the width direction W. Since the end portion 57 of the power storage module 30 is fixed to the center frame 22, the end portion 58 moves toward the side frame 21. In the processes such as the additive decomposition process S18, there is a possibility that variation occurs between the expanding rate of the power storage cells 42 and the expanding rate of the power storage cells 62. Therefore, cases occur where the positions of the end portion 58 of the power storage module 30 and the end portion 73 of the power storage module 31 are offset from each other in the width direction W.

Herein, it is assumed that the bus bar 53 connecting the power storage module 30 and the power storage module 31 is provided on the end portion 58, 73 side. In this case, when the positions of the end portion 58 of the power storage module 30 and the end portion 73 of the power storage module 31 are offset from each other in the width direction W, there is a possibility of damage to the bus bar 53, the external terminals of the power storage cells 42, 62, and so on.

On the other hand, in this embodiment, the bus bar 53 connecting the power storage module 30 and the power storage module 31 is provided on the end portion 57, 72 side of the power storage modules 30, 31. Since the end portions 57, 72 are fixed to the center frame 22, even when the expanding states of the power storage cells 42, 62 differ from each other, the positions of the end portions 57, 72 do not change. Therefore, even when the expanding states of the power storage cells 42, 62 differ from each other, it is possible to restrain damage to the bus bar 53 and so on.

While the power storage module 30 has mainly been described, the same treatments are applied to the power storage module 31 and so on.

Then, there are cases where the power storage cells 42 of the power storage module 30 are degraded over time by repeating charge and discharge of the power storage module 30. When the power storage cells 42 are degraded over time, the electrolyte solution 88 is decomposed to produce oxygen, hydrogen, and hydrocarbon so that gas is accumulated in the accommodation cases 80 to expand the accommodation cases 80. As a result, the power storage module 30 is deformed to extend in the width direction W.

When the power storage module 30 is deformed to extend in the width direction W, the end portion 58 of the power storage module 30 is moved to approach the side frame 21.

In this event, the bands 50, 51 of the restrainer 47 can be deformed to extend in the width direction W so that the power storage module 30 is allowed to deform.

Further, since fixtures or the like are not provided to the end portion 58 of the power storage module 30, it is restrained that the fixtures or the like are deformed due to deformation of the power storage module 30. That is, it is restrained that failure occurs due to deformation of the power storage module 30.

Figure 9:
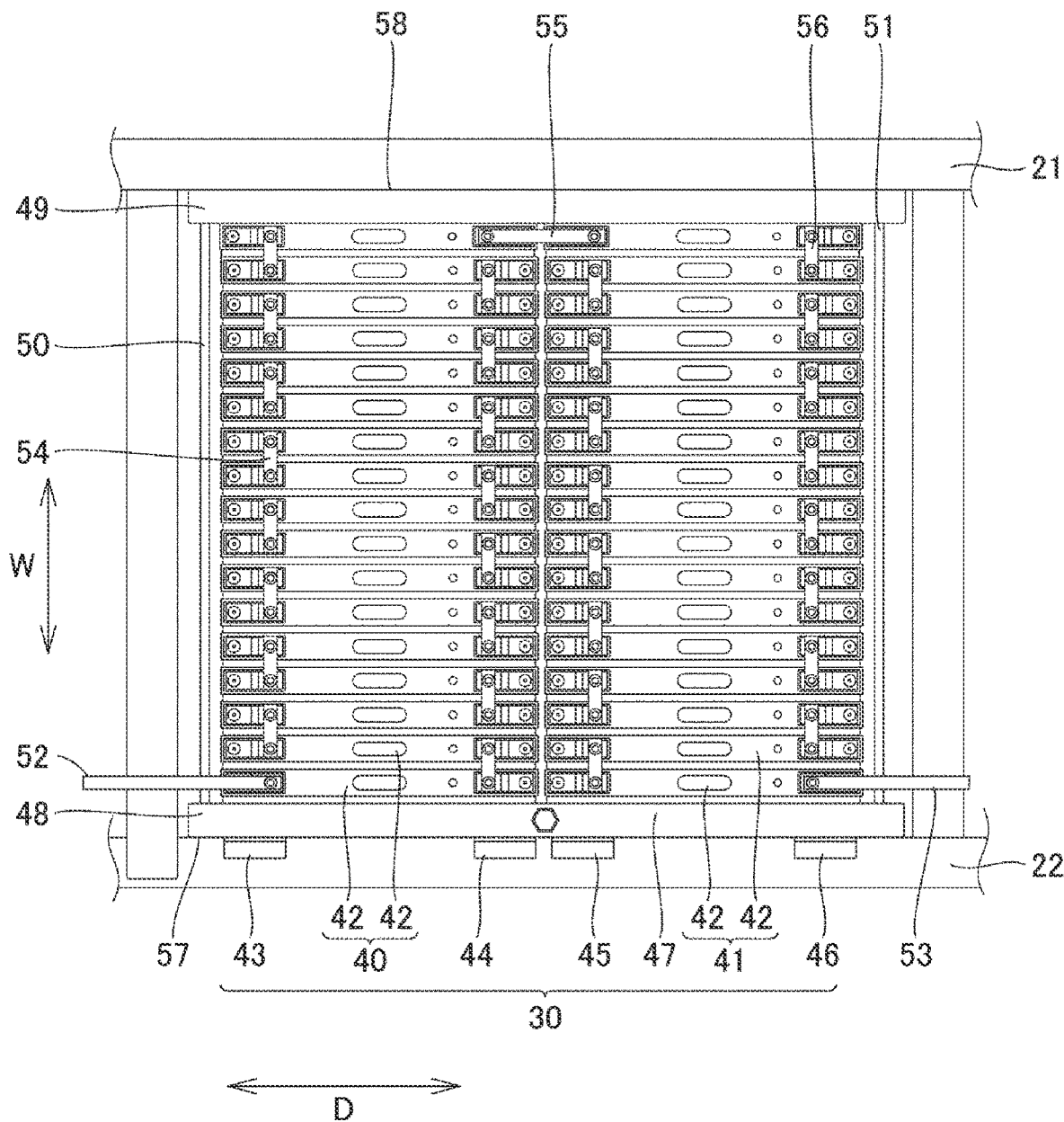
FIG. 9 is a plan view showing a state where a power storage module 30 is degraded over time.

FIG. 9 is a plan view showing a state where the power storage module 30 is degraded over time. When the deformation of the power storage module 30 advances, the end portion 58 is firmly pressed against the side frame 21.

When the end portion 58 of the power storage module 30 is firmly pressed against the side frame 21, the power storage module 30 is fixed between the side frame 21 and the center frame 22.

Therefore, even when the power storage module 30 further attempts to deform so as to extend in the width direction W, the deformation of the power storage module 30 is restrained by the side frame 21 and the center frame 22. By restraining the deformation of the power storage module 30 in this way, it is possible to restrain the occurrence of various adverse effects that may otherwise occur due to the deformation of the power storage module 30.

Figure 10:
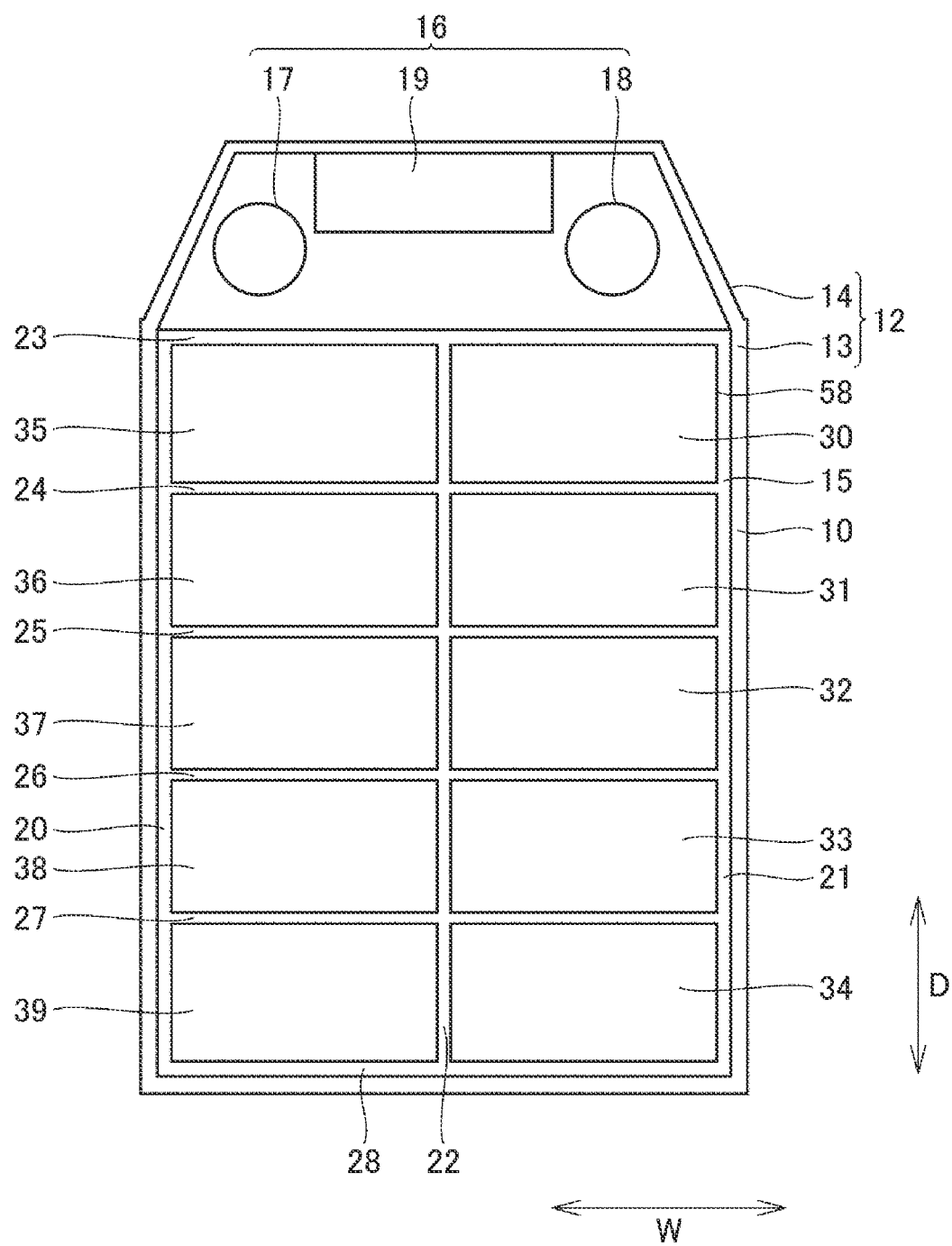
FIG. 10 is a plan view showing the power storage device 4.

While the power storage module 30 has been described in detail, the power storage modules 31 to 39 are also deformed like the power storage module 30 as shown in FIG. 10. Consequently, the power storage modules 31 to 34 are fixed between the center frame 22 and the side frame 21, and the power storage modules 35 to 39 are fixed between the center frame 22 and the side frame 20.

In the first embodiment described above, the power storage module 30 is fixed between the side frame 21 and the center frame 22 using the phenomenon that the power storage cells 42 are deformed to expand when the power storage cells 42 are degraded over time. On the other hand, the power storage module 30 may be fixed between the side frame 21 and the center frame 22 using the deformation of the power storage module 30 in the processes from the additive decomposition process S18 to the aging process S20.

That is, in the processes from the additive decomposition process S18 to the aging process S20, the power storage module 30 is deformed to extend in the width direction W. It may be configured that the power storage module 30 is firmly pressed against the side frame 21 at the time of completion of the aging process S20.

According to the power storage device 4 of the first embodiment, the power storage modules 30, 31 are fixed to the side frame 21 using the deformation of the power storage cells 42, 62. Therefore, when disposing the power storage modules 30, 31 in the reinforcing member 15, the degree of freedom of the length of the power storage modules 30, 31 in the width direction W is high, and therefore, it is possible to reduce time and labor in the manufacture of the power storage modules 30, 31.

Second Embodiment

Figure 11:
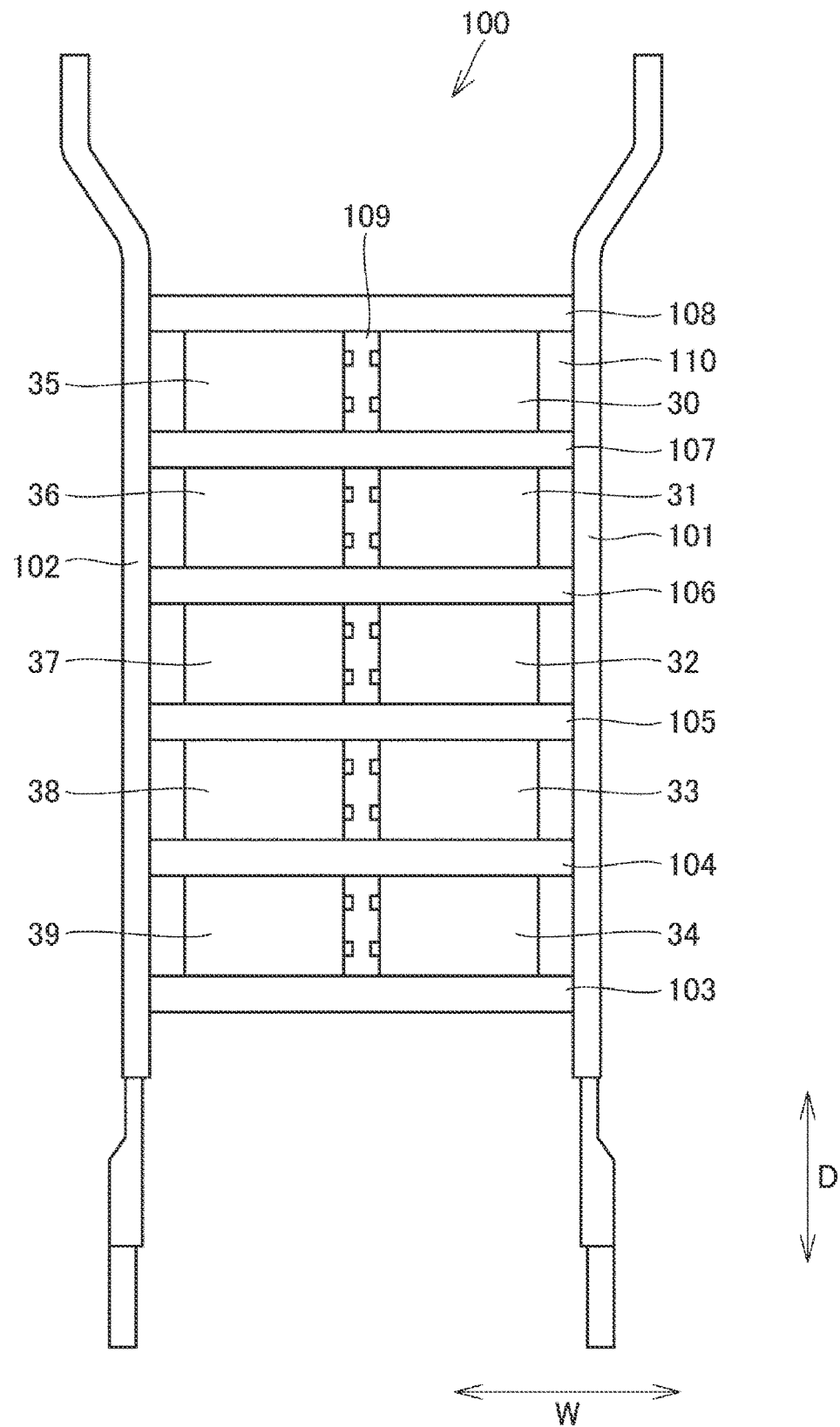
FIG. 11 is a plan view showing part of a skeleton frame 100 provided to a vehicle body 2.

In the first embodiment, the power storage modules 30 to 39 are fixed to the reinforcing member 15 provided in the case body 12. However, the fixing place of the power storage modules 30 to 39 is not limited to the reinforcing member 15. The power storage device 4 according to the second embodiment will be described with reference to FIG. 11 and so on. FIG. 11 is a plan view showing part of a skeleton frame 100 provided to the vehicle body 2. The skeleton frame 100 includes side members 101, 102, cross members 103, 104, 105, 106, 107, 108, a center member 109, and an under-cover 110.

The side members 101, 102 and the center member 109 are formed to extend in the front-rear direction D.

The side members 101, 102, the cross members 103, 104, 105, 106, 107, 108, and the center member 109 are arranged in a grid pattern so that accommodation spaces where the power storage modules 30 to 39 are respectively disposed are formed by these members.

The under-cover 110 is disposed on the lower side of the side members 101, 102 and the cross members 103 to 108.

The power storage modules 30 to 39 are fixed to the center member 109. Specifically, the end portions of the power storage modules 30 to 39 on the center member 109 side are fixed to the center member 109, while the end portions of the power storage modules 30 to 39 on the opposite side are not fixed and are provided so as to be movable in the width direction W. The power storage modules 30 to 39 are disposed on an upper surface of the under-cover 110.

Figure 12:
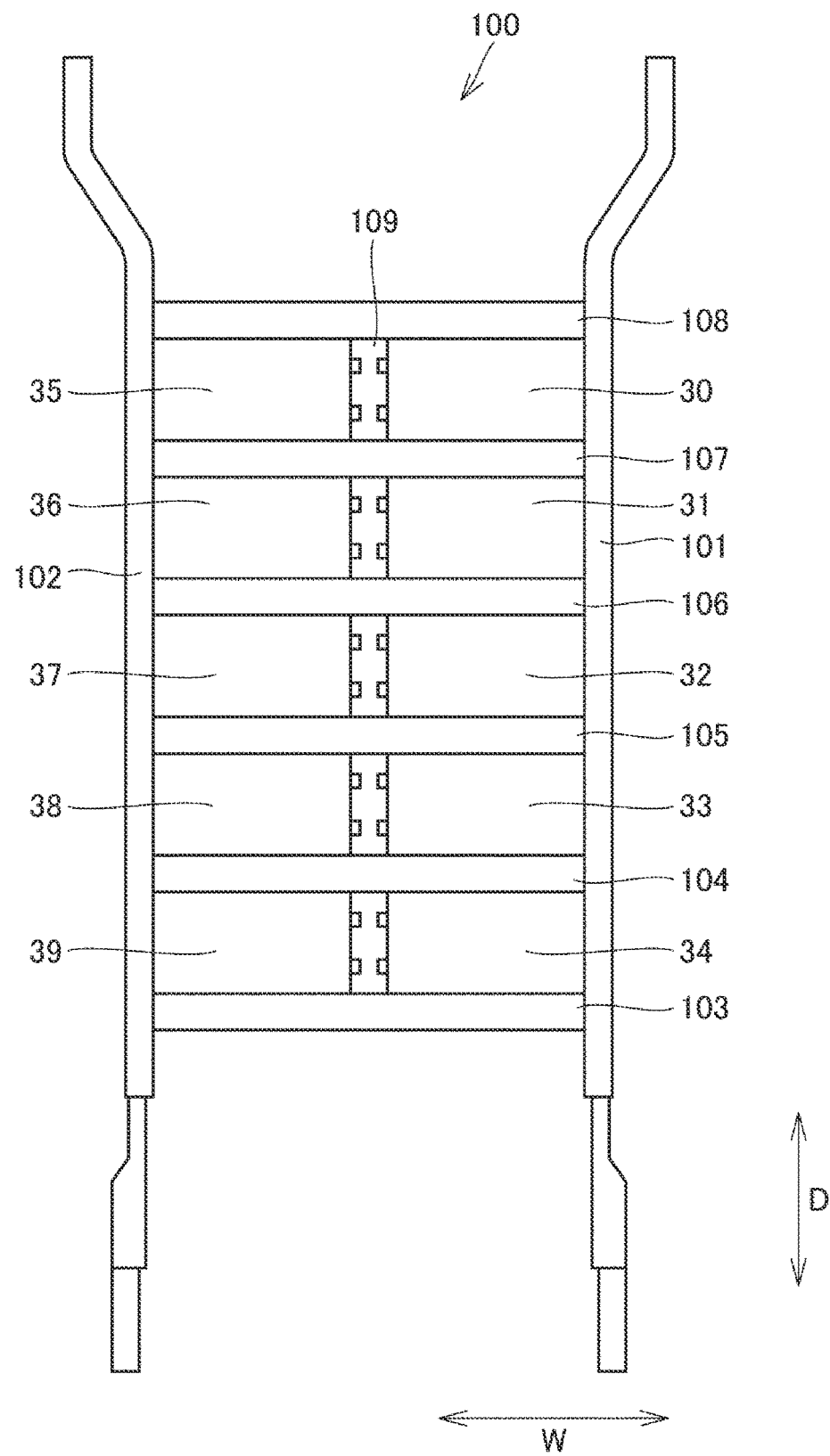
FIG. 12 is a plan view showing a state where power storage modules 30 to 39 are degraded over time.

FIG. 11 is a plan view showing a state before the power storage modules 30 to 39 are degraded over time. Gaps are formed between the end portions of the power storage modules 30 to 34 on the side member 101 side and the side member 101. Likewise, gaps are formed between the end portions of the power storage modules 35 to 39 on the side member 102 side and the side member 102. FIG. 12 is a plan view showing a state where the power storage modules 30 to 39 are degraded over time. The power storage modules 30 to 39 are deformed to extend in the width direction W due to the time degradation of the power storage modules 30 to 39. Consequently, the end portions of the power storage modules 30 to 34 on the side member 101 side are brought into close contact with the side member 101 so that the power storage modules 30 to 34 are fixed between the center member 109 and the side member 101. Likewise, the power storage modules 35 to 39 are also fixed between the center member 109 and the side member 102.

Also in the example shown in FIGS. 11 and 12, the power storage modules 30 to 39 may be fixed to the skeleton frame 100 by performing the additive decomposition process S18 through the aging process S20.

In the first and second embodiments described above, the description has been given of the example where a so-called prismatic battery is employed as a power storage cell. However, any of various other power storage cells may alternatively be used as a power storage cell.

In the first and second embodiments described above, the description has been given of the example where the width direction W being the horizontal direction is the stacking direction of the power storage cells. However, the disclosure can also be applied to an example where power storage cells are stacked in the vertical direction.

Third Embodiment

Figure 13:
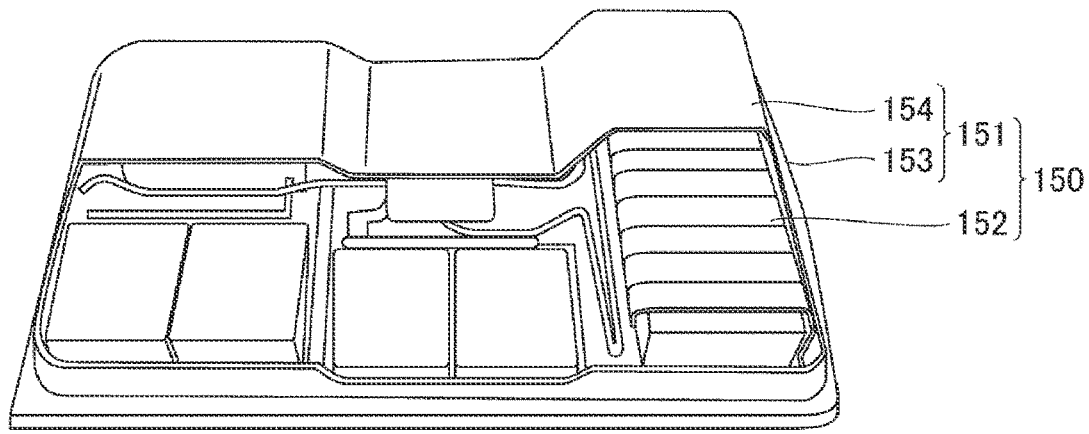
FIG. 13 is a perspective view schematically showing a power storage device 150.

A power storage device 150 according to the third embodiment will be described with reference to FIG. 13 and so on. FIG. 13 is a perspective view schematically showing the power storage device 150. In FIG. 13, the configuration is partially omitted for visualizing the internal configuration. The power storage device 150 includes an accommodation case 151 and a power storage unit 152.

The accommodation case 151 includes a case body 153 and a cover 154. The case body 153 and the cover 154 are made of, for example, a metal material such as an aluminum alloy. The case body 153 is formed with an opening that opens upward, and the cover 154 is provided to close the opening of the case body 153.

Figure 14:
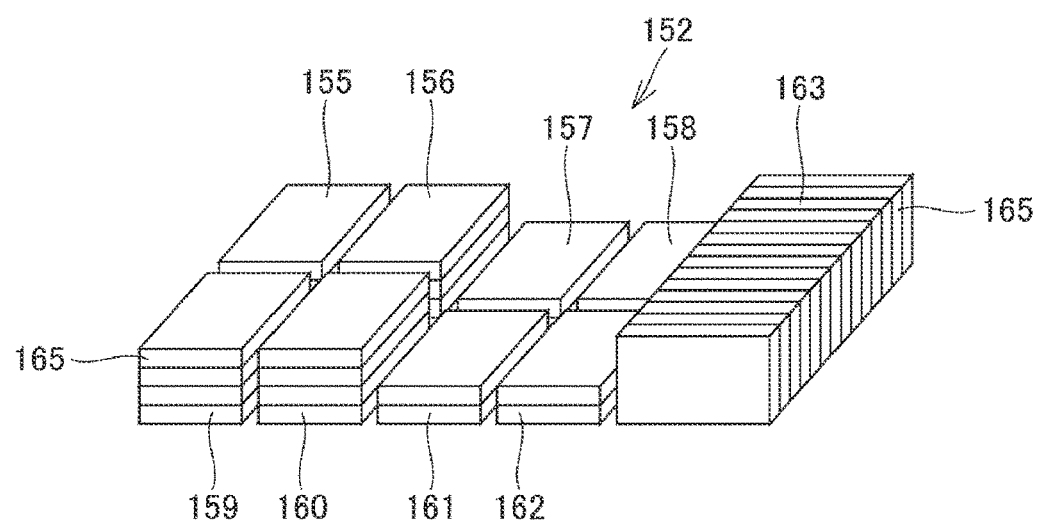
FIG. 14 is a perspective view schematically showing a power storage unit 152.

FIG. 14 is a perspective view schematically showing the power storage unit 152. The power storage unit 152 includes a plurality of power storage modules 155 to 163.

The power storage modules 155 to 163 each include a plurality of power storage cells 165. Herein, the power storage cells 165 of the power storage modules 155 to 162 are stacked in the vertical direction. The power storage cells 165 of the power storage module 163 are arranged in the front-rear direction D of the vehicle 1.

Figure 15:
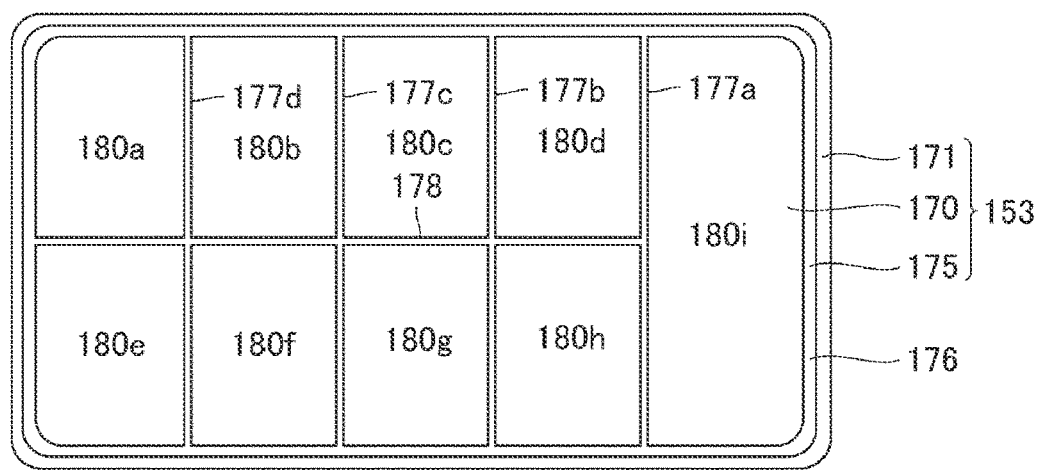
FIG. 15 is a plan view showing a case body 153.

FIG. 15 is a plan view showing the case body 153. The case body 153 includes a bottom plate 170, a peripheral wall portion 171, and a reinforcing member 175. The peripheral wall portion 171 is formed to extend upward from the outer peripheral edge portion of the bottom plate 170. The peripheral wall portion 171 is formed annular.

The reinforcing member 175 is provided on an upper surface of the bottom plate 170. The reinforcing member 175 is formed in a frame shape. The reinforcing member 175 includes an outer frame 176, a plurality of frames 177a to 177d, and a cross frame 178.

The outer frame 176 is formed annular along an inner peripheral surface of the peripheral wall portion 171. The frames 177a to 177d are formed to extend in the front-rear direction D. The cross frame 178 is formed to extend in the width direction W.

Accommodation spaces 180a to 180i where the power storage modules 155 to 163 are respectively disposed are formed by the frames.

Figure 16:
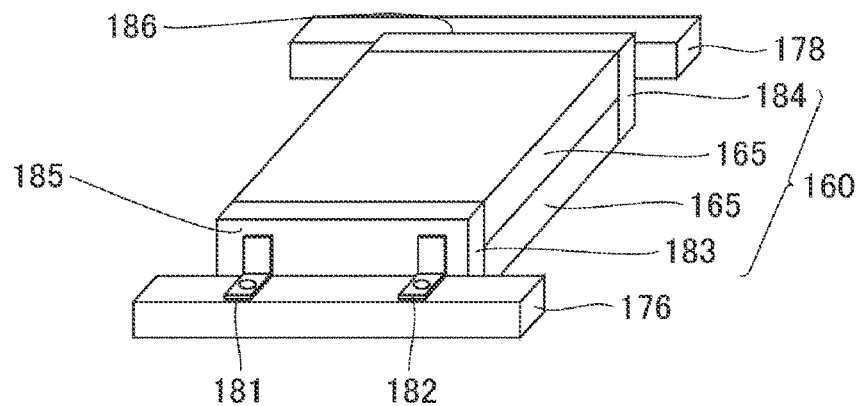
FIG. 16 is a perspective view showing a power storage module 160 and the configuration around the power storage module 160.
Figure 17:
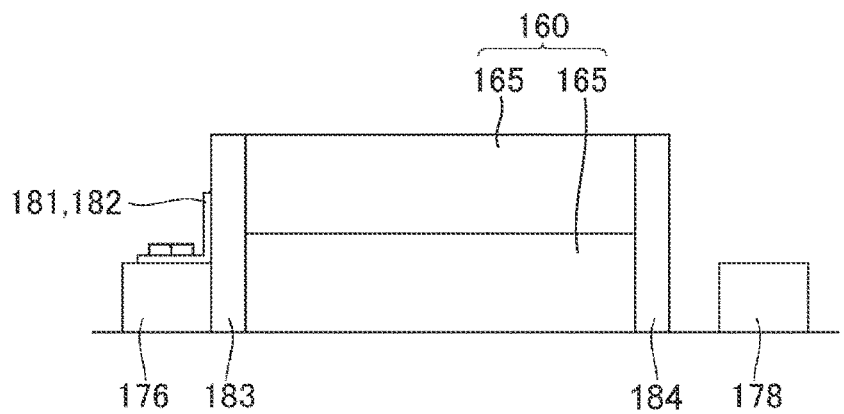
FIG. 17 is a side view showing the power storage module 160 and the configuration around the power storage module 160.

FIG. 16 is a perspective view showing the power storage module 160 and the configuration around the power storage module 160, and FIG. 17 is a side view showing the power storage module 160 and the configuration around the power storage module 160.

The power storage module 160 includes the power storage cells 165 and restraining plates 183, 184. The power storage module 160 is formed in a rectangular parallelepiped shape and has a side surface 185 and a side surface 186. The side surface 185 is located on the outer frame 176 side, and the side surface 186 is located on the cross frame 178 side.

The restraining plate 183 is provided at the side surface 185, and the restraining plate 184 is provided at the side surface 186.

The restraining plates 183, 184 restrain the power storage cells 165 stacked in the vertical direction.

Fixtures 181, 182 are provided to the restraining plate 183 so that the restraining plate 183 fixes the power storage module 160 to the outer frame 176. The restraining plate 183 is in contact with the outer frame 176. Alternatively, an insulating plate may be interposed between the restraining plate 183 and the outer frame 176.

On the other hand, the restraining plate 184 is provided with no fixture and is spaced apart from the cross frame 178.

Figure 18:
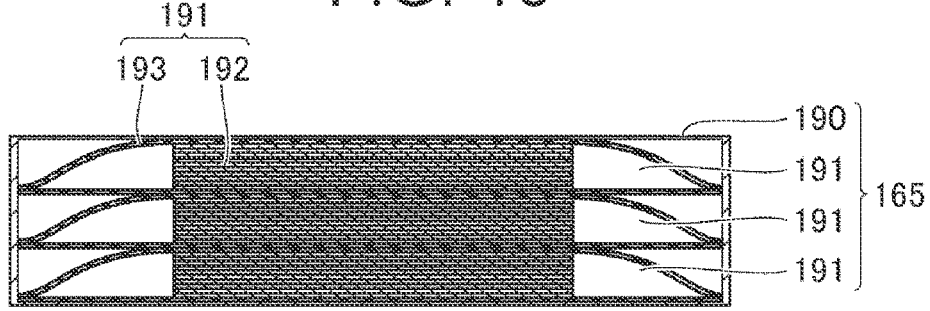
FIG. 18 is a sectional view showing a power storage cell 165.

FIG. 18 is a sectional view showing the power storage cell 165. The power storage cell 165 includes a cell case 190 and a plurality of unit batteries 191.

The cell case 190 is made of a metal material such as an aluminum alloy. The unit batteries 191 are stacked in the vertical direction.

The unit battery 191 includes an electrode assembly 192 and a packaging member 193. The electrode assembly 192 is formed by sequentially stacking a positive electrode, a separator, and a negative electrode. The packaging member 193 is formed by, for example, a laminated film. The electrode assembly 192 and an electrolyte solution (not shown) are placed in the packaging member 193.

When the unit batteries 191 configured as described above are degraded over time, gas is accumulated in the packaging members 193 so that the unit batteries 191 are deformed to expand. In this event, the unit batteries 191 are deformed to expand in the vertical direction and the horizontal direction. Therefore, the power storage cells 165 and the power storage module 160 are also deformed to expand in the vertical direction and the horizontal direction.

As shown in FIG. 17, since no fixture is provided to the restraining plate 184 of the power storage module 160, the power storage module 160 can be deformed to extend toward the cross frame 178.

Since no fixture is provided on the cross frame 178 side of the power storage module 160, even when the power storage module 160 is deformed to extend toward the cross frame 178, adverse effects such as deformation of fixtures do not occur.

Figure 19:
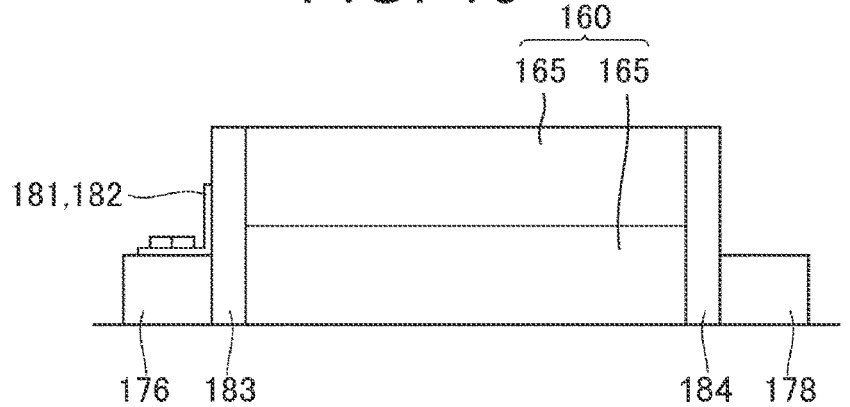
FIG. 19 is a sectional view schematically showing a state where a restraining plate 184 of the power storage module 160 is pressed against and in contact with a cross frame 178.

FIG. 19 is a sectional view schematically showing a state where the restraining plate 184 of the power storage module 160 is firmly pressed against the cross frame 178.

In the state shown in FIG. 19, the restraining plate 184 is firmly pressed against the cross frame 178, and the restraining plate 183 is fixed to the outer frame 176. Therefore, even when the power storage module 160 attempts to deform so as to expand in the front-rear direction D, the deformation of the power storage module 160 is restrained.

In this way, since the deformation of the power storage module 160 is restrained, it is possible to restrain deformation of members provided to the power storage module 160 or the like, which may otherwise occur due to the deformation of the power storage module 160.

Also in the power storage device 150 according to the third embodiment, when disposing the power storage module 160 in the accommodation case 151, the accuracy of the size of the power storage module 160 is not needed so much, and therefore, it is possible to reduce the burden of manufacturing the power storage module 160.

In the above-described embodiments, the description has been given of the example where a power storage cell of a lithium-ion battery is employed as a power storage cell. Alternatively, for example, a capacitor cell or the like may be employed instead of a power storage cell.

It should be considered that the embodiments disclosed above are for illustrative purposes only and are not limitative of the disclosure in any aspect. The scope of the disclosure is defined by the claims and intended to include all changes within the meaning and range of equivalents of the claims. Further, the above-described numerical values and so on are for illustrative purposes only, and the disclosure is not limited to the above-described numerical values and the range thereof.

What is claimed is:

1. A power storage device comprising:
at least one power storage module disposed between a first frame and a second frame disposed at an interval from each other, the power storage module including a plurality of power storage cells arranged in sequence, the first frame and the second frame provided in a vehicle or the power storage device; and
a fixture, wherein:
the power storage module is fixed to the first frame by the fixture, and the power storage module is pressed against the second frame and is in contact with the second frame and is not fixed to the second frame.

2. The power storage device according to claim 1, wherein, with expansion of the power storage module, the power storage module is pressed against the second frame and is in contact with the second frame.

3. A power storage device comprising:
a first frame and a second frame disposed at an interval from each other;
at least one power storage module disposed between the first frame and the second frame, the power storage module including a plurality of power storage cells arranged in sequence; and
a fixture, wherein:
the power storage module includes a first portion on a first frame side and a second portion on a second frame side;
of the first portion and the second portion, the fixture is provided only to the first portion; and
the fixture fixes the power storage module to the first frame,
wherein the second portion of the power storage module is pressed against the second frame and is in contact with the second frame, and the fixture does not fix the power storage module to the second frame.

4. The power storage device according to claim 1, wherein:
the power storage cells are arranged in sequence in a facing direction in which the first frame and the second frame face each other;
the power storage module includes a restrainer restraining the power storage cells;
the restrainer restrains the power storage cells such that the power storage cells are arranged in sequence in the facing direction; and
the restrainer is configured to deform in the facing direction.

5. The power storage device according to claim 1, wherein:
a plurality of the power storage modules is provided in the power storage device;
the power storage modules include a first power storage module and a second power storage module;
the power storage modules further include a bus bar electrically connecting the first power storage module and the second power storage module to each other; and
the bus bar is configured to connect a terminal of the first power storage module and a terminal of the second power storage module to each other, the terminal of the first power storage module being a terminal on an end side of the first power storage module and located on a first frame side, the terminal of the second power storage module being a terminal on an end side of the second power storage module and located on the first frame side.

6. The power storage device according to claim 1, wherein the power storage cells are arranged in sequence in an arrangement direction perpendicular to a direction in which the first frame and the second frame face each other.

7. The power storage device according to claim 4, wherein the restrainer includes a first end plate and a second end plate, the first end plate being provided at a first end face on a first end side in a sequence direction in which the power storage cells are arranged in sequence, the second end plate being provided at a second end face on a second end side in the sequence direction.

8. The vehicle according to claim 3, further comprising a restrainer including a first end plate and a second end plate, the first end plate being provided at a first end face on a first end side in a sequence direction in which the power storage cells are arranged in sequence, the second end plate being provided at a second end face on a second end side in the sequence direction.

* * * * *